United States Patent [19]
Bormioli

[11] Patent Number: 6,056,011
[45] Date of Patent: May 2, 2000

[54] PIPE FITTING PROVIDED WITH TWO BALL VALVES, ONE OF WHICH WITH CONCAVITY, THAT ARE ACTIVATED IN A SEQUENCE AND WITH QUICK RELEASE COUPLING MEANS SUBORDINATED TO THE CLOSING OF BOTH VALVES

[76] Inventor: Giorgio Bormioli, Via Galileo Galilei 21, Padova, Italy, 35100

[21] Appl. No.: 09/141,559

[22] Filed: Aug. 28, 1998

[30] Foreign Application Priority Data

Sep. 5, 1997 [IT] Italy .................................. MI97A2023

[51] Int. Cl.[7] ............................ E03B 65/20; E03C 65/20; F17D 65/20
[52] U.S. Cl. ............................... 137/614.06; 137/614.01; 137/614.05
[58] Field of Search ........................... 137/614.01, 614.05, 137/614.06; 251/149.2, 149.6, 149.9, 315.01, 315.16

[56] References Cited

U.S. PATENT DOCUMENTS

| | | | |
|---|---|---|---|
| 4,306,739 | 12/1981 | Bormioli | 285/18 |
| 4,664,149 | 5/1987 | Fremy | 137/614.06 |
| 5,488,972 | 2/1996 | McCracken et al. | 137/614.06 |
| 5,507,313 | 4/1996 | LeDevehat | 137/614.05 |

*Primary Examiner*—Henry J. Recla
*Assistant Examiner*—Timothy L. Maust
*Attorney, Agent, or Firm*—Jacobson, Price, Holman & Stern, PLLC

[57] ABSTRACT

A fitting including two fitting parts connectable to respective pipes and provided with respective ball valves one of which with concavity, and a coupling device of the quick release type for the aforementioned fitting parts. It provides a functional interconnection that prevents the closing of the valve without concavity before the closing of the valve with concavity and the release of the coupling device before the closing of the valve without concavity. The functional interconnection includes a first control lever for the closing rotation of the valve with concavity, a second control lever for the closing rotation of the valve without concavity, that is hinged on the same axes of the first lever and has a rotation subordinated to the removal of a mechanical block caused by the first lever in an opening position. A first hydraulic cylinder controls the rotation of the first lever toward a closing position of the valve with concavity, and a second hydraulic cylinder controls the rotation of the second lever toward a closing position of the valve without concavity after the removal of the mechanical block and, subsequently, the release of the coupling device of the two fitting parts.

4 Claims, 5 Drawing Sheets

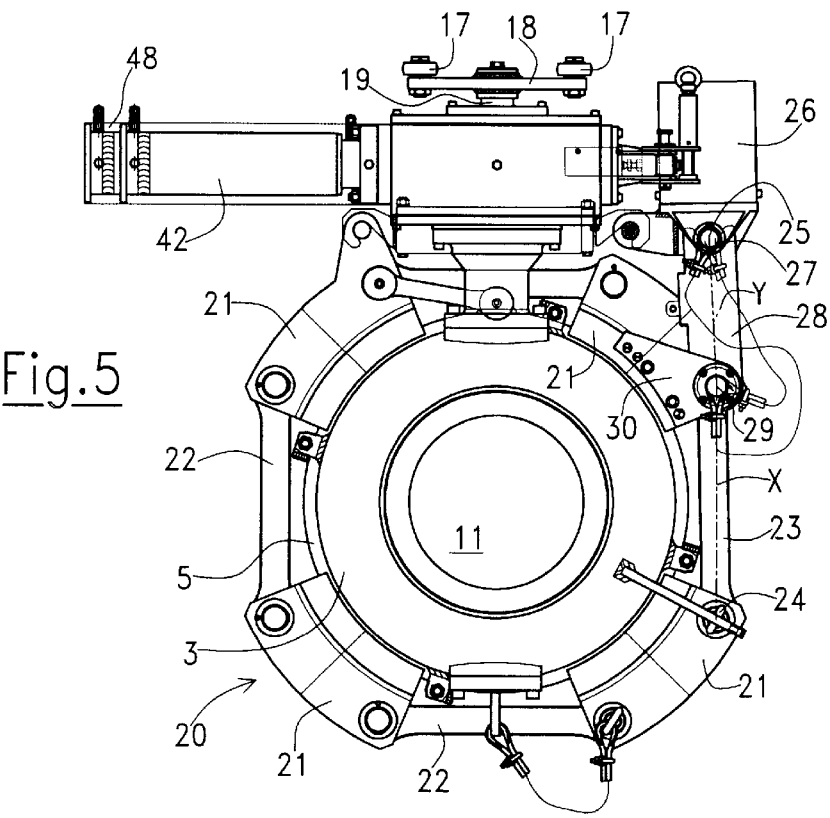
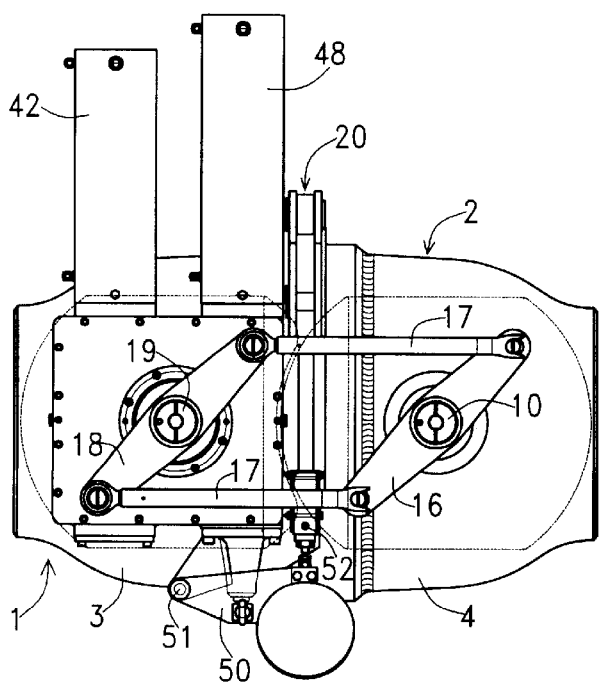
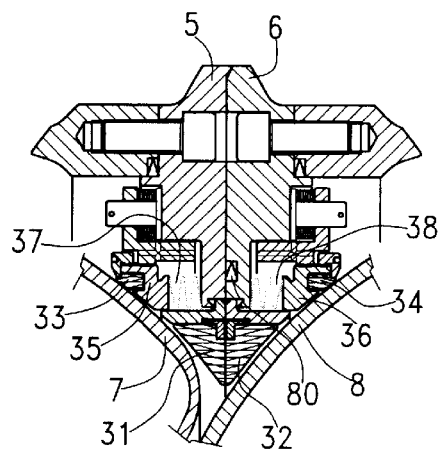

6,056,011

PIPE FITTING PROVIDED WITH TWO BALL VALVES, ONE OF WHICH WITH CONCAVITY, THAT ARE ACTIVATED IN A SEQUENCE AND WITH QUICK RELEASE COUPLING MEANS SUBORDINATED TO THE CLOSING OF BOTH VALVES

DESCRIPTION

The present invention concerns a coupling device for pipes provided with two ball valves, one of which with concavity, that are activated in a sequence and with quick release coupling means subordinated to the closing of both valves.

Pipe fittings that are formed by two parts fixed to respective pipes, that are kept together by coupling means that allow, in case of need, the quick separation of the two parts of the fitting, and therefore of the pipes, are already known.

Each one of the two parts of the fitting is provided with a closing valve of the ball type, that allows the tight closing of the respective pipe before the release of the coupling means occurs.

In order to limit at the maximum the quantity of fluid that gets trapped between the two valves and, once released, gets dispersed in the environment, it has become usual to realize one of the two valves with a concavity such as to allow the other valve to insert itself in it in the closing stage.

Obviously, in that case, the valve with concavity must bring itself to a closed position before the closing movement of the other one begins and only then the separation of the two pipes can take place.

A known coupling and quick release device is described in the U.S. Pat. No. 4,306,739 and comprises a articulated sequence of tightening pincers arrangeable bridging respective circumferencial portions of terminal flanges of the two parts of the fitting that are set alongside so as to form a coupling ring that is open on one end, and a closing bar of said ring that is movable upon command from a closed position to an open position of the same ring.

In view of this state of the art, an object of the present invention has been to provide a pipe fitting comprising two ball valves, one of which is concave, and a device for quick release coupling of the type described in the aforementioned US patent, in which functional interconnection means such as to determine a precise and obligatory sequence of closing operations of the concave valve and finally of release of the coupling device are provided.

According to the present invention, such object has been attained by means of a pipe fitting characterized in that said functional interconnection means comprise a first control lever for the closing rotation of the valve with concavity, a second control lever for the closing rotation of the valve without concavity, that is hinged on the same axes of the first lever and has a rotation subordinated to the removal of a mechanical block caused by said first lever in an open position, a first hydraulic cylinder to control the rotation of said first lever toward a closed position of the valve with concavity, and a second hydraulic cylinder to control the rotation of said second lever toward a closed position of the valve without concavity after the removal of said mechanical block and, subsequently, to control the release of the coupling device of the two parts of the fitting.

An embodiment of the fitting according to the invention is illustrated as a non-limiting example in the enclosed drawings, in which:

FIG. 1 shows in an axial section a pipe fitting according to the present invention with two valves in an open position;

FIG. 2 still shows in an axial section the aforementioned fitting with the valve with concavity rotated into a closed position;

FIG. 3 still shows in an axial section the aforementioned fitting with the two valves rotated into a closing position;

FIG. 4 shows the fitting of FIG. 1 as viewed in a top plan;

FIG. 5 shows the fitting of FIG. 1 as viewed from the left;

FIG. 6 shows a magnified detail of the fitting of FIGS. 1–3;

Figure 1:
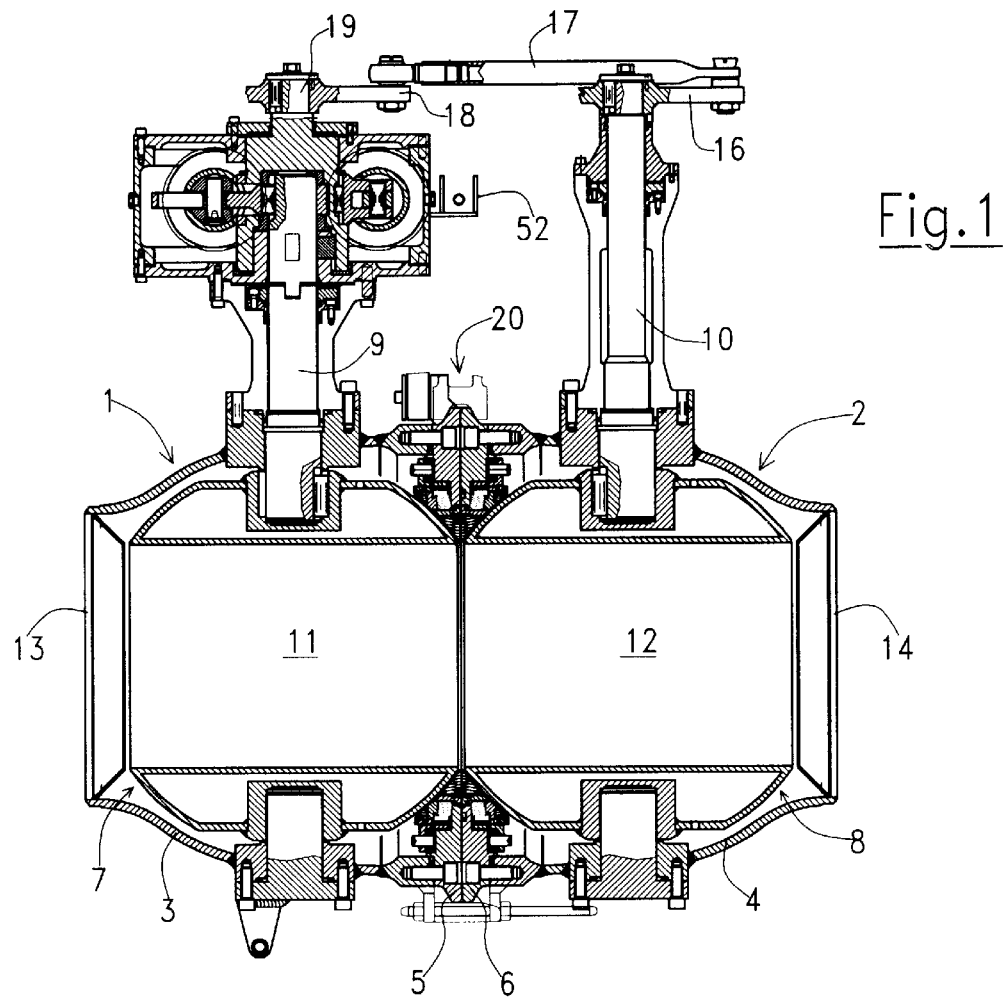
Figure 8:
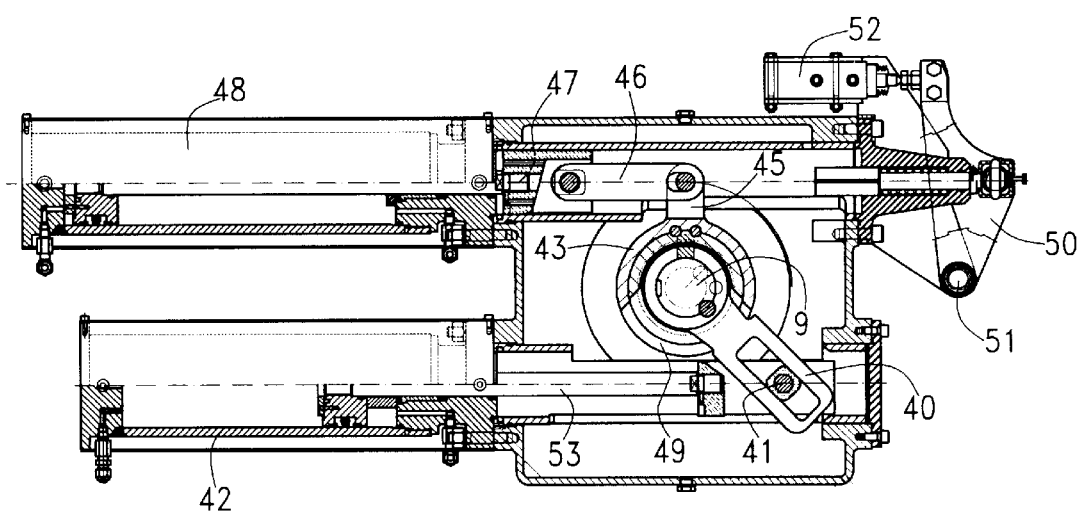
FIG. 8 shows the fitting in the position of FIG. 1 with open valve, as viewed in a section according to line VIII—VIII of FIG. 7 and rotated by 90° on the drawing plane.

The pipe fitting shown in the drawings is composed of two fitting parts 1 and 2 destined to be fixed to respective pipes to be coupled.

Each one of the two fitting parts 1 and 2 comprises an external concave body 3, 4 provided with terminal flange 5, 6 turned outside for the frontal coupling with the flange of the other part of the fitting.

Inside of each concave body 3, 4 a respective ball valve 7, 8 is turningly housed, that is made fixed to a respective driving shaft 9, 10 that is turningly supported by the concave body 3, 4 and extending outside of it. Both valves are passed through by a rectilinear duct 11, 12, that depending on the angular position of the respective valve can end up being lined up with the corresponding duct of the other valve and with a terminal mouth 13, 14 of the concave body 3, 4 (FIG. 1) or arranged perpendicular to the aforementioned position in order to close in that case the respective mouth 13, 14 (FIG. 3).

Figure 2:
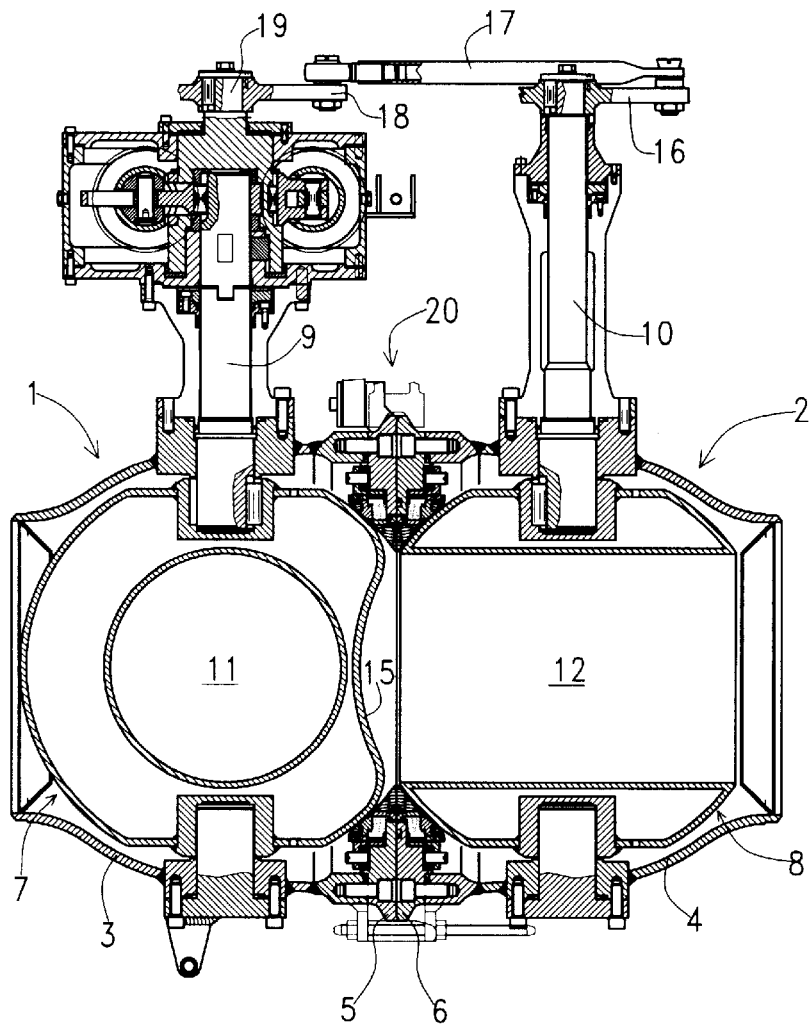
Figure 9:
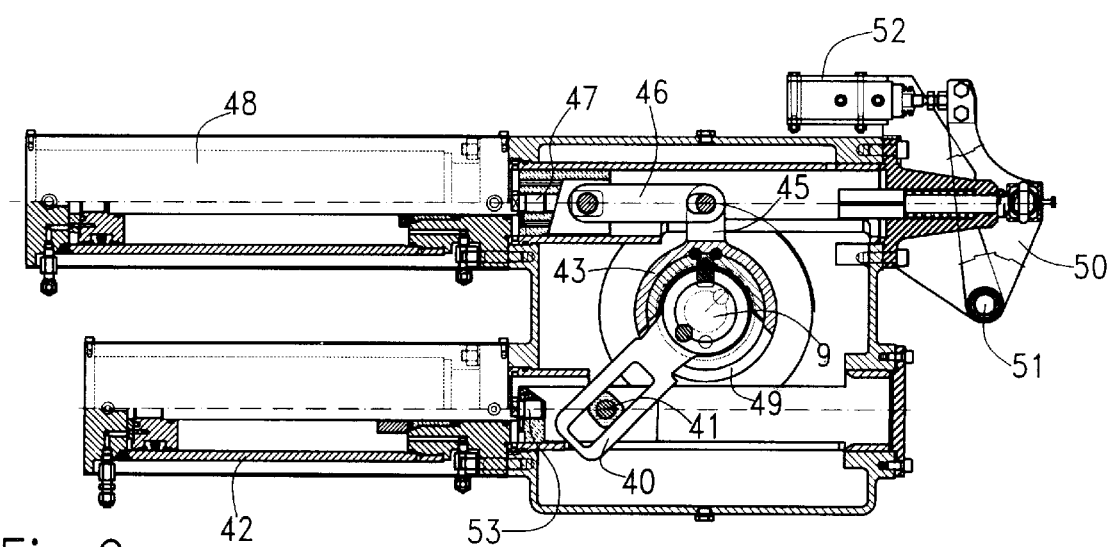
FIGS. 9 and 10 show sections similar to the one in FIG. 8 with the two valves respectively in the positions of FIGS. 2 and 3.
Figure 3:
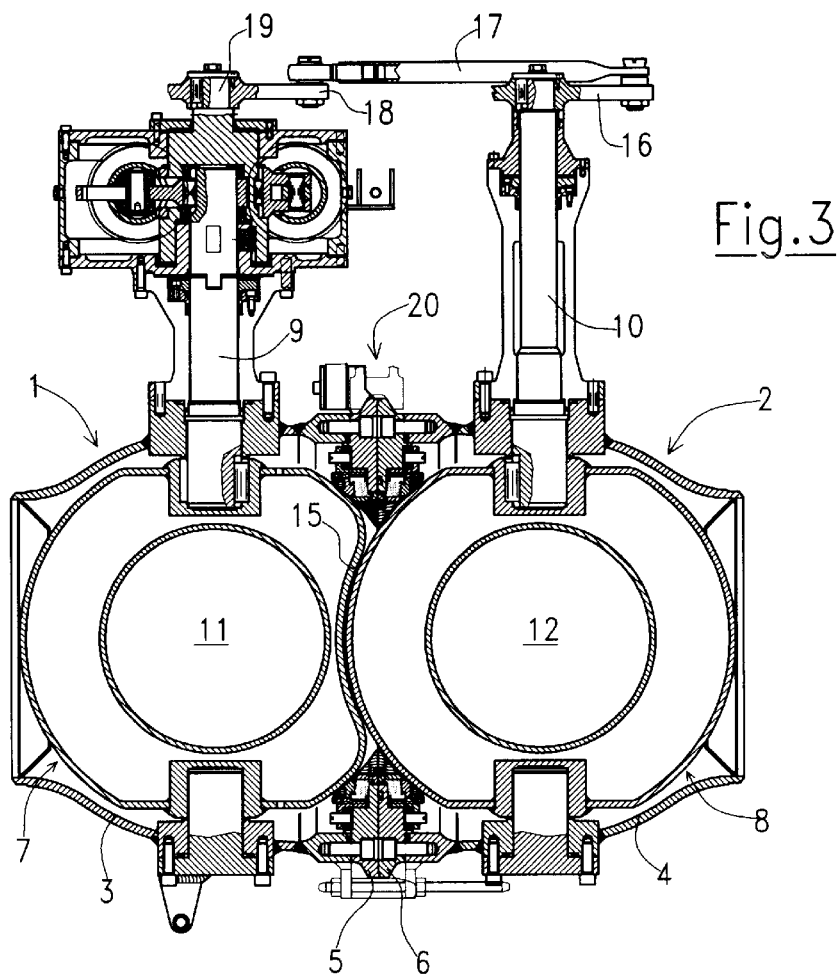
Figure 10:
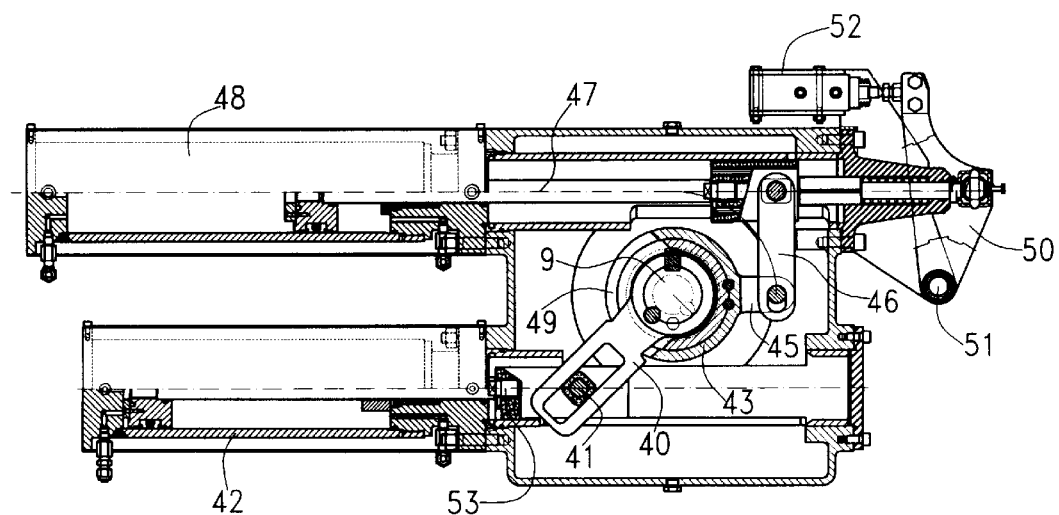

As it is possible to notice from FIGS. 2 and 3, the valve 8 has a perfectly spherical external periphery, while the valve 7 provides a concave peripheral portion 15, in which, with both valves in a closed position, a corresponding peripheral portion of the valve 8 can be inserted. In this way the quantity of fluid which remains between the two closed valves and that is destined to be dispersed in the external environment is reduced to a minimum.

At the top of the driving shaft 10 of the valve 8 a lever 16 is fixed, which through a pair of tension rods 17 (FIG. 4) is connected in an articulate way with an analogous lever 18 that is fixed to the upper part of a shaft 19, that is axially lined up with the driving shaft 9 of the valve 7 and is activated in the way that will be subsequently described in combination with it.

A quick release coupling device, that is illustrated and indicated as a whole with the numeric reference 20 in FIG. 5, provides for the separable connection of the two fitting parts 1 and 2 in the facing and lined up position of FIGS. 1–3. It consists in a device of the type described in the U.S. Pat. No. 4,306,739 (to be considered as incorporated in the present description), which comprises a sequence of tightening pincers 21 articulately connected by bars 22 and arrangeable across respective circumferencial portions of the terminal flanges 5, 6 of the parts of the connection so as to form a coupling ring that is open on one end. A closing bar 23 of said ring that is movable on command from a closing position (FIG. 5) to an opening position of the same ring is provided. This is obtained by causing the rotation with the proper thrust of the bar 23 around its fulcrim 24 in such a way that a locking pawl 25 fixed to a cylinder 26 in which the end of the bar 23 is slidingly inserted exits/protrudes from an end cavity 27 of a forked lever 28 hinged in fulcrum 29 on an appendix 30 of one of the tightening pincers 21. A series of springs (not shown) housed inside the cylinder 26 and cooperating with the end of the bar 23 in the way described in the aforementioned US patent normally maintains the pawl 25 inside the cavity 27 in such a way that the axes X of the bar 23 is moved toward the axes of the fitting as regards to the axes Y that ideally connects the same pawl with the fulcrum 29 of the forked lever 28. On the other hand, by applying an appropriate lateral thrust to the cylinder 26 (or to the bar 23) the aforementioned springs allow a limited sliding of the bar 23 as regards to the cylinder 26 and, as a consequence, the bar 23 rotates, bringing its axes X outside of the axes Y and thus causing the rotation of the forked lever 28 and the exit of the pawl 25 from the cavity 27 of the same lever. The coupling ring of the two flanges 5 and 6 therefore opens, thus allowing the immediate separation of the two fitting parts 1 and 2.

As shown in FIG. 6, when the two fitting parts 1 and 2 are maintained attached to each other by the coupling device 20, the wet seal between the two flanges 5 and 6 is ensured by the two filling rings 31, 32 fixed to the same flanges and by a gasket 80, while the wet seal as regards to the two valves 7 and 8 is ensured by additional gaskets 33, 34 provided on respective axially mobile rings 35, 36, also provided on the flanges 5, 6 and thrust toward the periphery of the valves 7 and 8 by respective springs 37, 38.

Figure 7:
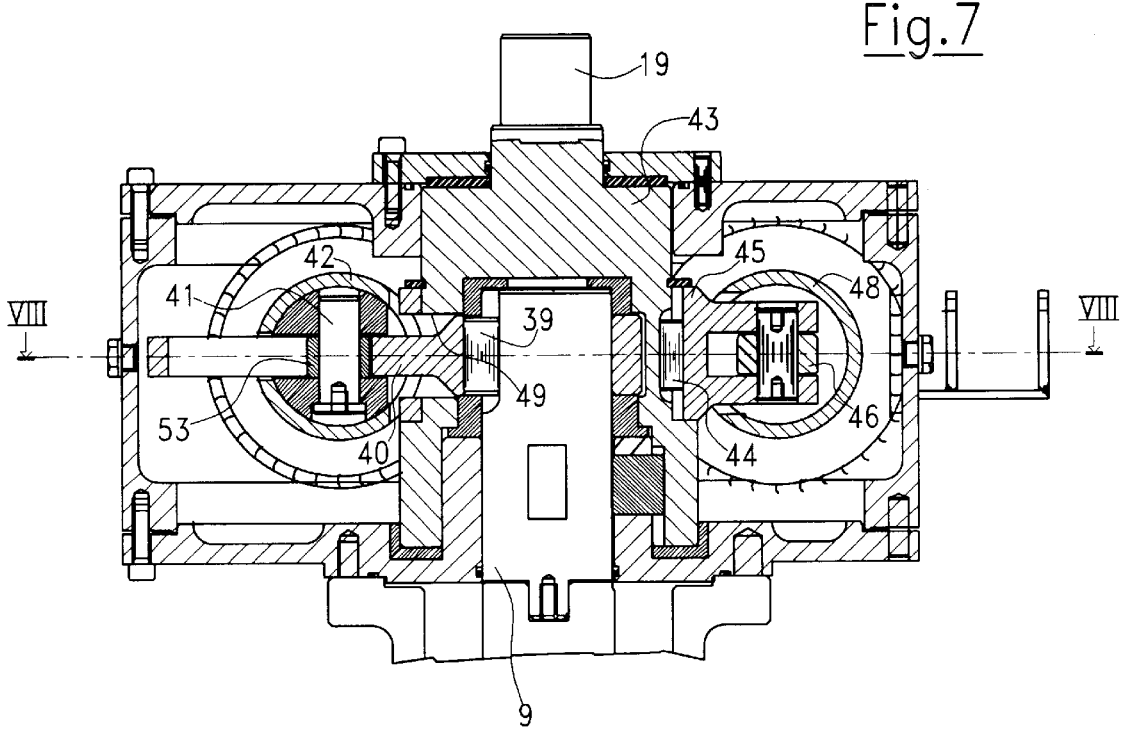
FIG. 7 shows another magnified detail of the fitting of FIGS. 1–3.
Figure 11:
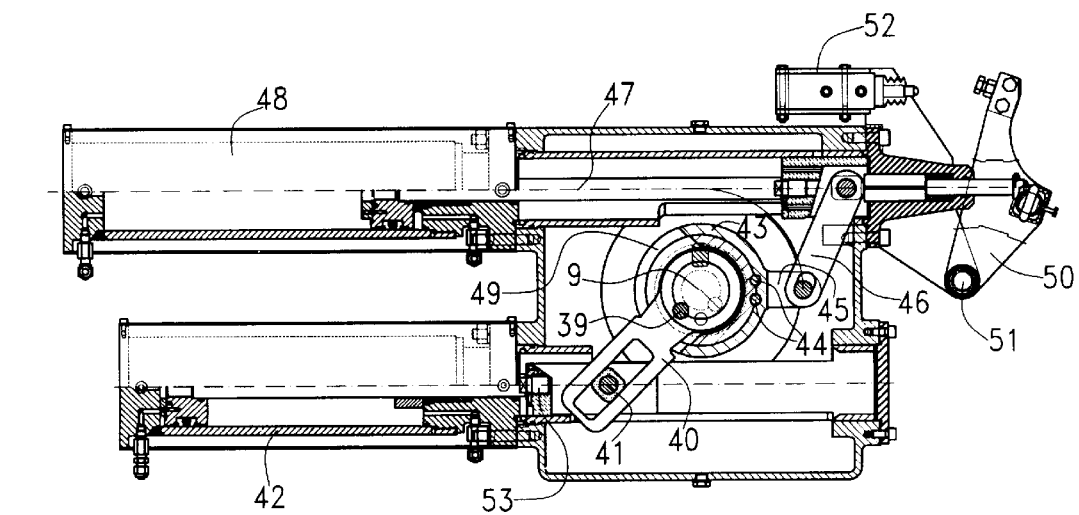
FIG. 11 shows a section similar to the one in FIGS. 8–10 with the fitting device controlled to operate the release of the two pipes.

As already mentioned, the driving shaft 10 of valve 8 is kinetically connected with a shaft 19 axially lined up with the driving shaft 9 of the valve 7. More precisely, as shown in FIG. 7, on the shaft 9 a first lever 40 is keyed in 39, which through a link block 41 connection receives motion from the rod 53 of a first hydraulic cylinder 42 (FIGS. 8–11). On the other hand, from the shaft 19 a reversed cup element 43 extends, which is turniingly fit on the shaft 9 and is in turn keyed in 44 with a second lever 45 connected through a connecting rod 46 with a rod 47 of a second hydraulic cylinder 48 parallel to the first cylinder 42 (FIGS. 4 and 8–11). Owing to its engagement into a radial cut 49 of the cup element 43, the first lever 40 serves as a blocking element to the rotation of the second lever 45. The rod 47 of the second hydraulic cylinder 48 also cooperates with a third lever 50 hinged in 51, that is normally maintained elastically against a fixed support 52 (FIGS. 4 and 8–10) but that can be brought far from it under the thrust of the rod 47 (FIG. 11) in order to operate in turn on the cylinder 26 (FIG. 5) and to move it to a position of release of the coupling device 20.

The entire closing procedure of the two valves 7 and 8 and of separation of the two pipes can be noticed in FIGS. 1–3 and 8–11. Starting from the position with open valves and coupled pipes of FIGS. 1 and 8, in which the lever 40 prevents the clockwise rotation of the cup element 43 and therefore the forwarding of the rod 47 under the control of the cylinder 48, the operation of the cylinder 42 with the subsequent backing of the piston rod 53 causes the clockwise rotation of the lever 40 (FIG. 9), that through the driving shaft 9 causes in turn the rotation of the valve 7 with concavity 15 up to the closing position of FIG. 2. The rotation of the lever 40 also causes the unlocking of the rotation of the lever 45, that the subsequent operation of the cylinder 48 can therefore set into clockwise rotation (FIG. 10), that through the cup element 43, the shaft 19, the articulate parallelogram 18, 17 and 16 and the driving shaft 10 causes in turn the rotation of the valve 8 up to the closing position of FIG. 3. The travel of the rod 47 of the cylinder 48 continues then until it provokes the operation of the lever 50 (FIG. 11) and the subsequent displacement of the cylinder 26 into the release position of the coupling device 20. The two fitting parts 1 and 2 can therefore separate together with the pipes to which they are attached.

I claim:

1. Pipe fitting comprising two fitting parts connectable with respective pipes provided with respective ball valves one of which with concavity, a coupling device for the two fitting parts and functional interconnection means such as to prevent the closing of the valve without concavity before the closing of the valve with concavity and to prevent the release of the coupling device before the closing of the valve without concavity, said functional interconnection means comprise a first control lever for the closing rotation of the valve with concavity, a second control lever for the closing rotation of the valve without concavity, that is hinged on a same axes of the first lever and has a rotation subordinated to a removal of a mechanical block caused by said first lever in an open position, a first hydraulic cylinder to control the rotation of said first lever toward a closing position of the valve with concavity, and a second hydraulic cylinder to control the rotation of said second lever toward a closing position of the valve without concavity after the removal of said mechanical block and, subsequently, to control the release of the coupling device of the two fitting parts.

2. Pipe fitting according to claim 1, wherein said coupling device comprises an articulated sequence of tightening pincers arrangeable across circumferential portions of adjacent terminal flanges of the two fitting parts so s to form a coupling ring open on one end, and a bar for the closing of said ring that is movable upon command from a position of closing to a position of opening of the ring.

3. Pipe fitting according to claim 2, wherein said functional interconnection means comprise a third lever that can be activated by said second cylinder after the rotation of said second lever and operating in turn said closing bar of the coupling device.

4. Pipe fitting comprising two fitting parts connectable with respective pipes provided with respective ball valves one of which with concavity, a coupling device for the two fitting parts and functional interconnection means such as to prevent the closing of the valve without concavity before the closing of the valve with concavity and to prevent the release of the coupling device before the closing of the valve without concavity, said functional interconnection means comprise a first control lever for the closing rotation of the valve with concavity, a second control lever for the closing rotation of the valve without concavity, that is hinged on a same axes of the first lever and has a rotation subordinated to a removal of a mechanical block caused by said first lever in an open position, a first hydraulic cylinder to control the rotation of said first lever toward a closing position of the valve with concavity, and a second hydraulic cylinder to control the rotation of said second lever toward a closing position of the valve without concavity after the removal of said mechanical block and, subsequently, to control the release of the coupling device of the two fitting parts, said mechanical block being determined by engagement of said first lever in a radial cut of a cup shaped element turning on the same axes of the first lever and rigidly connected with said second lever.

* * * * *